US012603840B2

(12) United States Patent
Tyagi et al.

(10) Patent No.: US 12,603,840 B2
(45) Date of Patent: Apr. 14, 2026

(54) SECURE VIRTUAL PRIVATE MOBILE AND IP NETWORK IN CLOUD

(71) Applicant: Telnyx LLC, Chicago, IL (US)

(72) Inventors: Anirudh Tyagi, Chicago, IL (US); Mohamed Kamar, Chicago, IL (US); David Casem, Chicago, IL (US)

(73) Assignee: Telnyx LLC, Chicago, IL (US)

( * ) Notice: Subject to any disclaimer, the term of this patent is extended or adjusted under 35 U.S.C. 154(b) by 0 days.

(21) Appl. No.: 18/502,910

(22) Filed: Nov. 6, 2023

(65) Prior Publication Data

US 2024/0073132 A1    Feb. 29, 2024

Related U.S. Application Data

(63) Continuation of application No. 17/634,781, filed as application No. PCT/US2020/020312 on Feb. 28, 2020, now Pat. No. 11,831,545.

(Continued)

(51) Int. Cl.
*H04L 45/586* (2022.01)
*H04L 41/0895* (2022.01)
(Continued)

(52) U.S. Cl.
CPC ........ *H04L 45/586* (2013.01); *H04L 41/0895* (2022.05); *H04L 45/507* (2013.01); *H04W 40/04* (2013.01); *H04W 84/18* (2013.01)

(58) Field of Classification Search
CPC . H04L 12/4633; H04L 12/4641; H04L 12/66; H04L 41/0895; H04L 41/40;
(Continued)

(56) References Cited

U.S. PATENT DOCUMENTS 8,560,663 B2 * 10/2013 Baucke .................. H04L 49/70
370/255
10,491,462 B1    11/2019 Wagner
(Continued)

FOREIGN PATENT DOCUMENTS

CN        103368807 A    10/2013
CN        104205757 A    12/2014
(Continued)

OTHER PUBLICATIONS

Brown, Gabriel, and Heavy Reading. "Designing 5G-Ready Mobile Core Networks." White Paper, Heavy Reading. (Year: 2016).*
(Continued)

*Primary Examiner* — John M Macilwinen
(74) *Attorney, Agent, or Firm* — Crowell & Moring LLP

(57) ABSTRACT

This disclosure relates to a fully software-defined, fully virtualized, and customizable mobile communication platform deployed on public cloud infrastructure. Such mobile networks allows for end to end control of automatic and programmatic deployment and configuration of the mobile network components. The implementations below effectively enables instant creation and deployment of a true private global end-to-end Software Defined Network (SDN) for 3G, 4G, LTE, and 5G mobile communication from the ground up. Users will effectively act their own mobile carrier, allowing them to customize the features available to them via a programmatic interface.

20 Claims, 11 Drawing Sheets

Related U.S. Application Data

(60) Provisional application No. 62/886,471, filed on Aug. 14, 2019.

(51) Int. Cl.
| | |
|---|---|
| *H04L 45/50* | (2022.01) |
| *H04W 40/04* | (2009.01) |
| *H04W 84/18* | (2009.01) |

(58) Field of Classification Search
CPC ..... H04L 45/50; H04L 45/507; H04L 45/586; H04L 67/563; H04L 67/63; H04W 8/183; H04W 84/18
See application file for complete search history.

(56) References Cited

U.S. PATENT DOCUMENTS

| | | | | |
|---|---|---|---|---|
| 2009/0304004 | A1 | 12/2009 | Huynh Van et al. | |
| 2012/0266231 | A1 | 10/2012 | Spiers | |
| 2014/0159913 | A1 | 6/2014 | Shaw et al. | |
| 2015/0032846 | A1 | 1/2015 | Doken et al. | |
| 2015/0055623 | A1* | 2/2015 | Li | H04L 45/566 |
| | | | | 370/329 |
| 2016/0065422 | A1 | 3/2016 | Khargharia et al. | |
| 2016/0352682 | A1 | 12/2016 | Chang et al. | |
| 2017/0346657 | A1* | 11/2017 | Huynh Van | H04L 9/30 |
| 2018/0006935 | A1 | 1/2018 | Mutnuru et al. | |
| 2018/0026877 | A1 | 1/2018 | Mysyk | |
| 2018/0041905 | A1* | 2/2018 | Ashrafi | H04L 41/0816 |
| 2018/0359323 | A1 | 12/2018 | Madden | |

FOREIGN PATENT DOCUMENTS

| | | | |
|---|---|---|---|
| CN | 105283879 A | 1/2016 | |
| CN | 105379227 A | 3/2016 | |
| CN | 107566440 A | 1/2018 | |
| WO | WO 2021/029910 A1 | 2/2021 | |

OTHER PUBLICATIONS

Costa-Requena, Jose, et al. "SDN and NFV integration in generalized mobile network architecture." 2015 European conference on networks and communications (EuCNC). IEEE. (Year: 2015).*

Forte, Andrea G., et al. "A next-generation core network architecture for mobile networks." Future Internet (April) 11.7: 152. (Year: 2019).*

Hawilo, Hassan, et al. "NFV/SDN-based vEPC solution in hybrid clouds." 2018 IEEE Middle East and North Africa Communications Conference (MENACOMM). IEEE. (Year: 2018).*

Sousa, Bruno, et al. "Toward a fully cloudified mobile network infrastructure." IEEE Transactions on Network and Service Management 13.3: 547-563. (Year: 2016).*

Yang, Mao, et al. "Software-defined and virtualized future mobile and wireless networks: A survey." Mobile Networks and Applications 20.1: 4-18. (Year: 2015).*

Examination Report dated Oct. 1, 2024 issued in Australian Patent No. 2020327874, 3 pages.

Abdelwahab, Sherif, et al.; "Network function virtualization in 5G"; IEEE Communications Magazine, 54.4: 84-91; 2016.

Nguyen, Van-Giang, et al.; "SDN/NFV-based mobile packet core network architectures: A survey"; IEEE Communications Surveys & Tutorials, 19.3: 1567-1602; 2017.

Ponnekanti, Seshaiah; "Open RAN deployment using advanced radio link manager framework to support mission critical services in 5G"; EAI Endorsed Transactions on Cloud Systems, 5.14: e6-e6; 2019.

Raza, Muhammad Taqi, et al.; "Rethinking LTE network functions virtualization"; 2017 IEEE 25th International Conference on Network Protocols (ICNP); IEEE; 2017.

Tran, Tuyen X., et al.; "Collaborative mobile edge computing in 5G networks: New paradigms, scenarios, and challenges"; IEEE Communications Magazine, 55.4: 54-61; 2017.

Extended European Search Report dated Jun. 15, 2023 for European Application No. 20852579.0.

Chinese Office Action with English translation, Jun. 14, 2024, pp. 1-32, issued in Chinese Patent Application No. 202080057532.2, State Intellectual Property Office.

Japanese Office Action with English translation, Nov. 27, 2023, pp. 1-8, issued in Japanese Patent Application No. 2022-509667.

Japanese Office Action with English translation, Jun. 4, 2024, pp. 1-8, issued in Japanese Patent Application No. 2022-509667.

First Examination Report issued on Feb. 13, 2025 for Canadian Patent Application No. 3,147,086.

"Brocade achieves universal data privacy protection in public and private cloud deployments for new IP"; Office Automation Magazine, 299; Mar. 15, 2015; with English translation (2 pages).

Yang, D. et al.; "Virtual Private Cloud Based Power-Dispatching Automation System—Architecture and Application"; IEEE Transactions on Industrial Informatics, vol. 15, No. 3; Mar. 2019; 11 pages.

Notice of Allowance dated Nov. 28, 2025 for Chinese Patent Application No. 202080057532.2, with English translation (10 pages).

Mexican Office Action wtih English translation, Feb. 5, 2026, pp. 1-12, issued in Mexican Patent Application No. MX/a/001559.

* cited by examiner

SECURE VIRTUAL PRIVATE MOBILE AND IP NETWORK IN CLOUD

This application is a continuation application of and claims the benefit of priority to the U.S. patent application Ser. No. 17/634,781, filed on Feb. 11, 2022, which is based on claims the benefit of priority to the PCT International Application No. PCT/US2020/020312 filed on Feb. 28, 2020, which is based on and claims benefit of priority to the U.S. Provisional Patent Application No. 62/886,471 filed on Aug. 14, 2019.

TECHNICAL FIELD

This disclosure relates to a fully software-defined, fully virtualized, and customizable mobile communication platform deployed on public cloud infrastructure.

BACKGROUND

Mobile networks may include radio access networks and mobile core networks interconnected with backhaul circuits. Mobile networks may further communicate with other data networks via public Internet. Traditional mobile core networks rely heavily on fixed, custom built hardware components to perform functions required to achieve end-to-end communications. These hardware-driven mobile core networks are rigid, inflexible, and inelastic during deployment and subsequent provisioning and maintenance. With an increasing convergence of various previously distinct types of network traffic (e.g., voice, messaging, and data), the legacy mobile core networks may be simplified to the extent that an entire mobile core network could be virtualized and implemented in software without relying on dedicated hardware components.

SUMMARY

This disclosure relates to a fully software-defined, fully virtualized, and customizable mobile communication platform deployed on public cloud infrastructure as a mix of configurable instances of cloud containers and cloud daemons. Such a mobile network allows for private and secure routing of end-to-end network traffic within the mobile network and between the mobile network and other private and public networks. Such a mobile network may be instantly deployed in the cloud with high elasticity. They may further be automatically and programmatically provisioned and reconfigured during operation. The implementations disclosed herein effectively provides a platform that enables instant and dynamic creation and deployment of a true private global end-to-end software-defined network (SDN) for 3G, 4G, LTE, and 5G mobile communication from the ground up. Users of such a platform essentially act as their own mobile carrier, allowing them to customize the features available to them via a programmatic interface.

In one implementation, a method for information routing via such a mobile network is disclosed. The method may include intercepting first data from a wireless terminal device at a radio network controller; and redirecting the first data to a private software-defined and fully virtualized mobile core and data routing network deployed in a public cloud platform wherein the mobile core and data routing network comprise a mixture of multiple cloud instances of data processing containers and multiple cloud data routing daemons. The method may further include directing the first data through the multiple cloud instances of data processing containers to a first private virtual packet gateway implemented as one instance of the multiple cloud instances of data processing containers within the mobile core and data routing network; routing the first data from the first private virtual packet gateway to the multiple cloud data routing daemons; routing the first data from the multiple cloud data routing daemons to an independent cloud application terminated at a second packet gateway via a private virtual cross connect implemented in the public cloud platform. The method may further include providing access of the independent cloud application to the wireless terminal device.

In another implementation, a private software-defined and fully virtualized mobile core and data routing network deployed in a public cloud platform is disclosed. The mobile core and data routing network may include a first set of instances of cloud containers configured to receive data from a wireless terminal device via a radio network controller; and a second set of instances of cloud containers configured to implement a set of mobile core network functions by processing the data received by the first set of instances of cloud containers from the radio network controller. The virtualized mobile core and data routing network may further include a third set of instances of cloud containers and a set of routing daemons deployed in the public cloud platform. The third set of instances of cloud containers may act as packet gateways for routing the data processed by the second set of instances of cloud containers to the set of routing daemons deployed in the public cloud platform. The set of routing daemons may be configured to rout the data received at the set of routing daemons to a private cloud network configured for routing messages according to multiprotocol label switching.

In yet another implementation, a private wireless sensor network is disclosed. The wireless sensor network may include a plurality of distributed sensors each integrated with a wireless subscriber identity module (SIM) having multiple international mobile subscriber identity (IMSI) profiles that are remotely activatable. The wireless sensor network may further include a private software-defined and fully virtualized mobile core deployed in a public cloud platform for receiving data collected by the plurality of distributed sensors via a radio access network to generate output data. The mobile core may include a mixture of multiple instances of data processing containers for processing the received data; a plurality of private routing daemons deployed in the public cloud platform; and a private cloud network configured for routing messages according to multiprotocol label switching. The output data of the mobile core may be further routed from the plurality of private routing daemons to the private cloud network, and is further routed from the private cloud network to a private cloud application.

DETAILED DESCRIPTION

This disclosure relates to a fully software-defined, fully virtualized, and customizable mobile communication platform deployed on public cloud infrastructure as a mix of configurable instances of cloud containers and cloud daemons. Such a mobile network allows for private and secure routing of end-to-end network traffic within the mobile network and between the mobile network and other private and public networks. Such a mobile network may be instantly deployed in the cloud with high elasticity. They may further be automatically and programmatically provisioned and reconfigured during operation. The implementations disclosed herein effectively provides a platform that enables instant and dynamic creation and deployment of a true private global end-to-end software-defined network (SDN) for 3G, 4G, LTE, and 5G mobile communication from the ground up. Users of such a platform essentially act as their own mobile carrier, allowing them to customize the features available to them via a programmatic interface.

Figure 1:
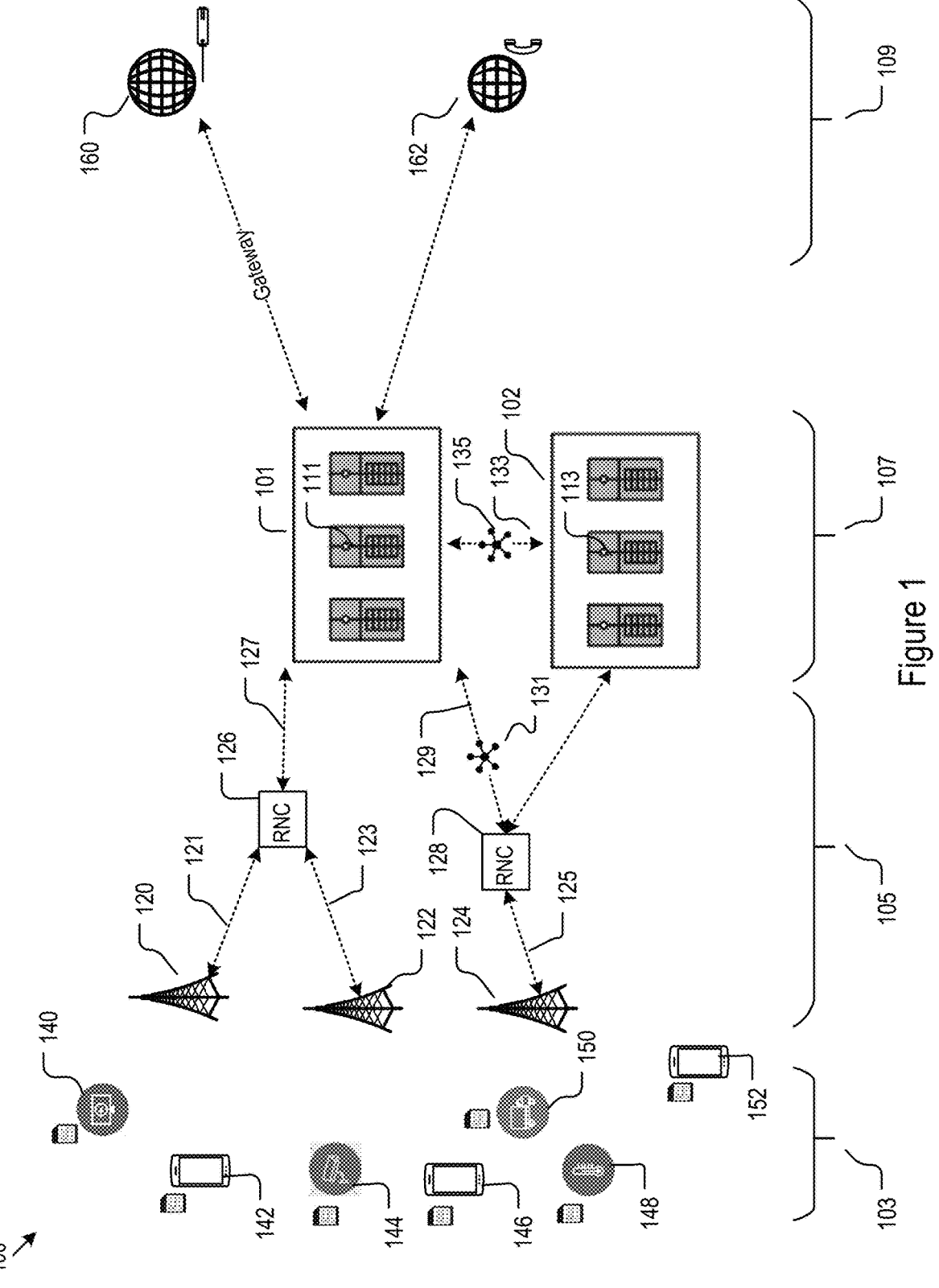
FIG. 1 shows an example architecture of a traditional mobile communication platform based on dedicated hardware components for achieving functionality of mobile core networks.

FIG. 1 illustrates an example system architecture of a mobile communication network 100. The mobile communication network 100 may include user equipment (UE) 103 communicating with mobile core networks (CNs) 107 via radio access networks (RANs) 105. The user equipment 103 may be implemented as mobile or fixed terminal devices including but not limited to mobile phones, tablets, personal digital assistants (PDAs), wearable devices, distributed sensors, Internet-of-things (IoT) terminals, desktop computers, and laptop computers that are configured to access the RANs 105 via wireless connections. These example terminal devices are illustrated in FIG. 1 as 140-152.

The radio access network 105, for example, may include base stations 120, 122, 124 and radio network controllers (RNCs) 126 and 128. The base stations 120, 122, and 125 may aggregate wireless uplink signals from the user equipment and broadcast wireless downlink signals to the user equipment via over-the-air radio channels. The RNCs 126 and 128 may further aggregate signals from base stations120, 122, and 124 or distribute signals to the base stations 120, 122, and 124 via wired backhaul connections shown by the dashed arrows 121, 123, and 125. The RNCs further function to control the base stations connected therewith to provide provisioning of the radio channels and signal characteristics.

As further shown in FIG. 1, the RNCs 126 and 128 may communicate with the mobile core network 101 via wired backhaul 127 and 129. The mobile core network 101 may be designed to perform various control, signal processing, information routing, and signal gateway functions according to a predefined stack of transmission and signaling protocols for voices, messages, and/or data packets separately or in a converged manner (all as data packets, for example). The mobile core network 101 may further transmit data to or receive data from other networks 109. For example, as shown in FIG. 1, the mobile core network 101 may communicate with an IP network such as the Internet 160, a fixed voice network such as the public switched telephone network (PSTN) 162, and the like. As such, signals can be routed between user equipment 140-152 and the Internet 160 and/or the PSTN 162 via the mobile core network. Signals may further be routed between one user equipment and another user equipment via the base stations, the RNCs, and the mobile core network.

The base stations, the RNCs and the mobile core network, collectively referred to as a mobile network, may be installed and operated by a single wireless carrier or provider. Different wireless carriers may independently operate their own mobile networks. A user may subscribe a terminal device to a particular wireless carrier to access the mobile network of that wireless carrier. When the user terminal is moved to a geographic region where only base stations from other wireless carriers are accessible, the user terminal may still be permitted to connect to these base stations by roaming. For example, as shown in FIG. 1, base stations 120, 122, RNC 126 and mobile core network 101 may be operated by a first wireless carrier, whereas base station 124 and RNC 128 may be operated by a second wireless carrier. User equipment 140-150 may be subscribed to the first wireless carrier whereas user equipment 152 may be subscribed to the second wireless carrier. Among the user equipment 140-150 subscribed to the first wireless carrier, the user equipment 140-144 may be located within the signal coverage area of the base stations 120 and 122 of the first wireless carrier and thus can access the mobile network of the first wireless network without roaming. However, the user equipment 146-150 that are also subscribed to the first wireless carrier may be located outside the signal coverage area of the base stations 120 and 122 but within the coverage area of the based station 124 belonging to the second wireless carrier. The user equipment 146-150 may thus roam on the mobile network provided by the second wireless carrier. The signal from the user equipment 146-150 and received by the base station 124 and the corresponding RNC 128 may be delivered by the second wireless carrier to the mobile core network 101 of the first wireless carrier via an exchange node, as indicated by node 131. Such signal may then be processed and routed by the mobile core network 101 to other wireless user equipment (such as user equipment 140-144), the IP network (e.g., internetwork 160), the PSTN 162, and the like, wherever the destination of the signal is determined to be.

The mobile core network 101 belonging to the first wireless carrier may further deliver signal to a mobile network belonging to the second wireless carrier, as indicated by 102 of FIG. 1, so that the user equipment subscribed to the first wireless carrier (such as user equipment 140-144) can communicate with user equipment 152 subscribed to the second wireless carrier. In this case, communication information may be delivered from the mobile core network 101 to the mobile core network 102 via an exchange node, as indicated by arrow 133 and node 135. Such communication information may then be further transmitted to the user equipment 152 subscribed to the second wireless carrier via the mobile core network 102, the RNC 128 and the base station 124. Likewise, the user equipment 152 subscribed to the second wireless carrier may send communication information to the user equipment subscribed to the first wireless carrier (such as user equipment 140-144) using a reverse path, i.e., along base station 124, RNC 128, mobile core network 102, mobile core network 101, RNC 126, and base station 120 or 122.

Figure 2:
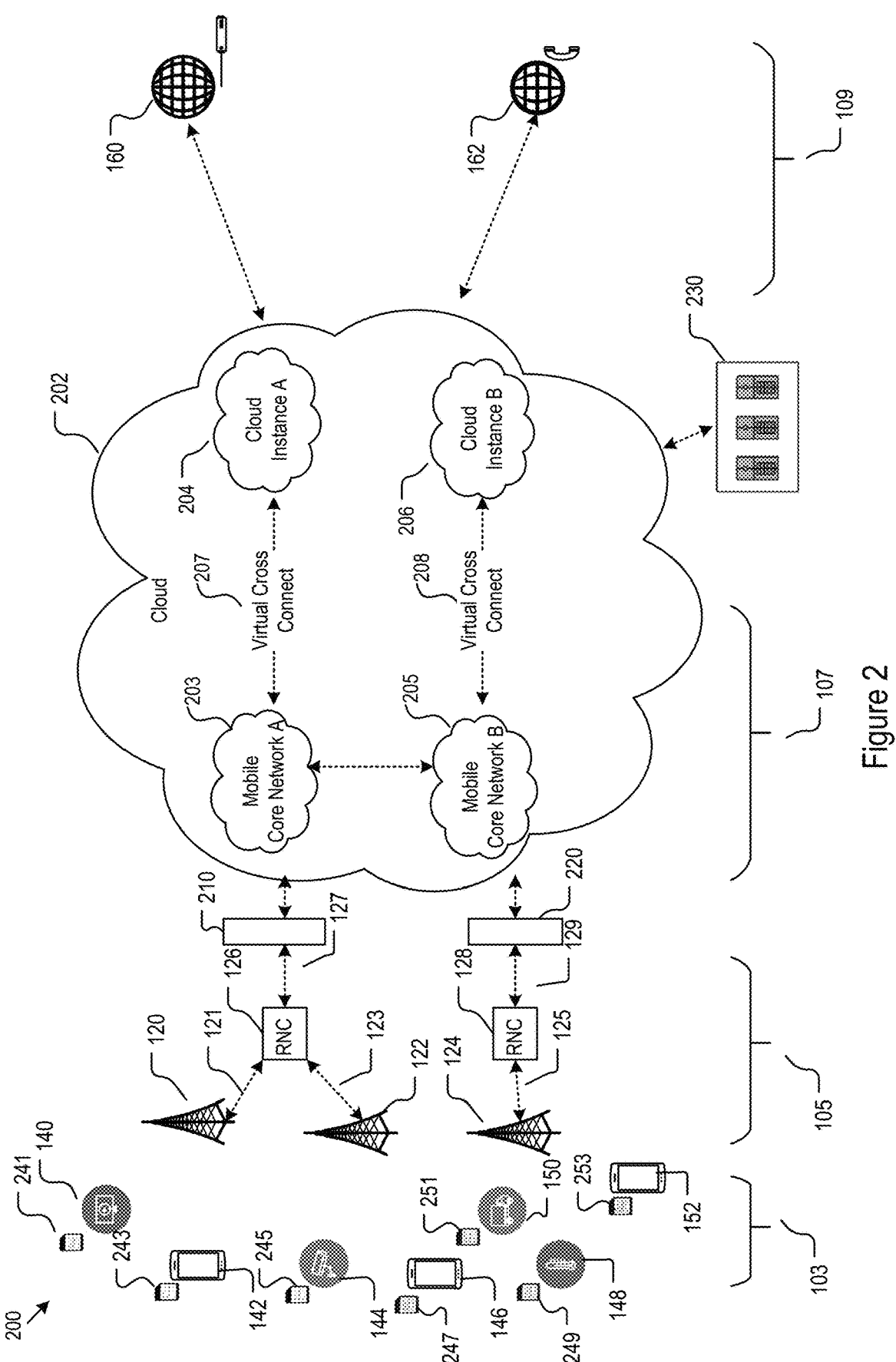
FIG. 2 shows an example architecture of a mobile communication platform with mobile cores fully defined in software and fully virtualized in public cloud infrastructure.

The mobile core network 101 and 102 of FIG. 1 may be implemented as dedicated custom hardware components for performing the various network functions, as shown in FIG. 1 as equipment racks and cabinets 111 and 113 within the mobile core network 101 and 102. Alternatively, the mobile core network 101 and 102 may be fully implemented and defined in software and fully virtualized, as shown in FIG. 2. In the particular implementation shown in FIG. 2, the radio access network portion 105 of the mobile network remains identical to that of the implementation in FIG. 1, but the mobile core network 107 (including, for example, mobile core network A 203 and mobile core network B 205) may be deployed in public cloud platform 202, and as software instances rather than dedicated equipment racks. The cloud-based mobile core networks 203 and 205 may further communicate with other off-cloud networks 109 including but not limited to the IP network 160, the PSTN system 162, and other off-cloud mobile core network 230.

Implementation of the mobile core network 101 and 102 in dedicated hardware components as shown in FIG. 1 faces several drawbacks and limitations whereas the mobile core networks 203 and 205 fully virtualized in cloud as shown in FIG. 2 are advantageous in several aspects. Specifically, implementations of mobile core network based on dedicated and customized hardware are inflexible, inelastic, and difficult to deploy, modify, reconfigure, expand, and scale. For example, expansion and scaling of the capacity of the hardware based mobile core networks usually involve replacing costly equipment and often take exceedingly long periods of time to install and to test. Utilization of various hardware components in different parts of such core networks, even if deployed initially with careful consideration, may become unbalanced as the user profiles evolve, leading to loss of efficiency in using the deployed hardware network equipment. Upgrades are often limited without replacing outdated network equipment. As the network equipment based on hardware implementation requires very high capital outlay, they are usually deployed and configured by large wireless carriers serving a large customer base. As such, configuration of the network often cannot be elastically tailored to individual or a group of subscribers. The network configuration is generally rigid and static, and it may be very difficult to implement network configurations automatically and programmatically.

Virtualized mobile core networks, however, are much more agile, flexible, elastic, and straightforward to deploy, particularly when such mobile core networks are implemented in cloud to leverage existing underlying hardware resources and cloud management and provisioning tools and interfaces. Such virtualized mobile core networks may be deployed in the cloud instantly without direct capital investment on expensive dedicated hardware components. As a result, there is a low barrier of network deployment, and a mobile core may be deployed at a simple mouse click. Likewise, modification, expansion and scaling of such virtualized mobile core networks that have already been deployed would only involve software update and cloud resource reconfiguration. Deployment, maintenance, upgrades, replacement, and configuration of the underlying hardware resources would be taken care of by providers of the cloud platform and service, independent of and decoupled from the software-defined mobile core networks.

Because of the flexibility and elasticity offered by software-defined mobile core networks in cloud, an institution, an enterprise or the like (referred to as "enterprise" herein) may act as its own wireless carrier. In other words, an enterprise, for example, may choose to deploy its own private global mobile core network rather than sharing mobile core network with others. In one scenario, the enterprise may desire to connect its employees via its private global mobile core network. In another scenario, the enterprise may desire to connect its wireless sensors distributed across various geographic locations into a sensor network via its private mobile core network. The enterprise may further deploy its own global mobile core network to integrate both its mobile employees and sensors to form a combined private global network. Regardless of specific needs of an applications, such private mobile core networks may be deployed and configured instantly as cloud instances with initial cloud resource allocation tailored to the number of users (or sensors) and the overall mobile communication needs and characteristics of the enterprise. Allocation of the underlying cloud resources for the private mobile core network may further be provisioned dynamically and in real-time after the initial deployment, based on the communication pattern of the enterprise as a function of time. For example, the private mobile core network of the enterprise may be more heavily used in a particular time window of a day, a particular week of a month, and/or a particular month or season of a year, depending on the nature of the business of the enterprise and characteristics of user communication. Accordingly, the private mobile core network implemented in the cloud may be provided with real-time elasticity in resource allocation and may particularly leverage cloud provisioning tools and interfaces that have already been developed and provided by the cloud service providers for dynamic and predictive provisioning and allocation of cloud computing resources. Such private mobile core networks thus reduce resource imbalance and under-utilization and provide a more efficient mobile communication system. In addition, because such private mobile core networks may be deployed independent of other mobile cores, they can be easily customized and configured in software automatically or at any chosen time.

As further shown in the implementation 200 of FIG. 2, the radio access network 105 may remain un-virtualized. The enterprise described above having its private virtualized mobile core network 203 and 205 may not need to deploy its own radio access network. Rather, it may use existing radio access network 105 deployed by and belonging to other wireless mobile carriers. The enterprise may piggyback on these radio access network by receiving wireless signals from the radio access network 105 and directing the signals to its private mobile core network in the cloud, or routing signals from the private mobile core network to the radio access network 105, both via edge exchange connection 210 and 220 of FIG. 2. These exchange connection may be made by network edge connectors co-located with RNC 126 and 128 of the radio access network prior to the backhaul 127 and 129, or co-located at traditional mobile cores nodes belonging to the traditional wireless carriers owning the access network 105, after the backhaul 127 and 129.

The enterprise acting as its own global wireless carrier with the deployment of its software-defined mobile core network in the cloud may in turn be associated with a set of subscriber identify modules (SIMs). These SIMs may be provided to wireless devices 140-152 of the enterprise, as indicated by 241, 243, 245, 247, 249, 251, and 253 of FIG. 2. These SIMs may be recognized by the radio access network 105 as roaming devices and the signals from the wireless devices associated with these SIMs may be routed accordingly through the network edge connectors 210 and 220 to and from the mobile core network implemented in the cloud. In some implementations, these SIMs may contain multiple international mobile subscriber identity (IMSI) profiles under the embedded universal integrated circuit card (eUICC) specification. These eUICCs may be remotely configured and activated between different IMSI profiles. They are particularly suitable for deployment with remote sensor devices that are difficult or inconvenient to access physically after installation. As the radio access network evolves, these devices may communicate with the partner radio access network in roaming mode or sponsored mode, or home radio access network, using different IMSI profiles that may be programed without physical access to the SIMs installed in the devices.

The virtualized mobile core network 203 and 205 of FIG. 2 as implemented in the cloud may offer an additional benefit to the enterprise acting as its own global wireless carrier. This is further illustrated in both FIG. 2 and FIG. 3. Conceptually, the enterprise may deploy one or more information technology (IT) and computing infrastructure in the cloud (labeled as cloud instance A 204 and cloud instance B 206 in FIG. 2), independent of the mobile core networks. It may be desirable for the enterprise to provide seamless access of these cloud computing infrastructures to its mobile users. Because both the mobile core network and the one or more cloud computing infrastructures are implemented as cloud instances, the communications between them may be routed within the cloud, facilitated by network processing and routing daemons also implemented in the cloud that function as virtual cross connects 207 and 208 shown in FIG. 2. The signal and information being routed within the cloud may be protected by cloud security mechanism such as generic routing encapsulation (GRE, similar to IPSec). As such, the mobile users of the enterprise may access the cloud computing infrastructures via the virtual mobile core network without exposing the information being communicated to public internet.

Figure 3:
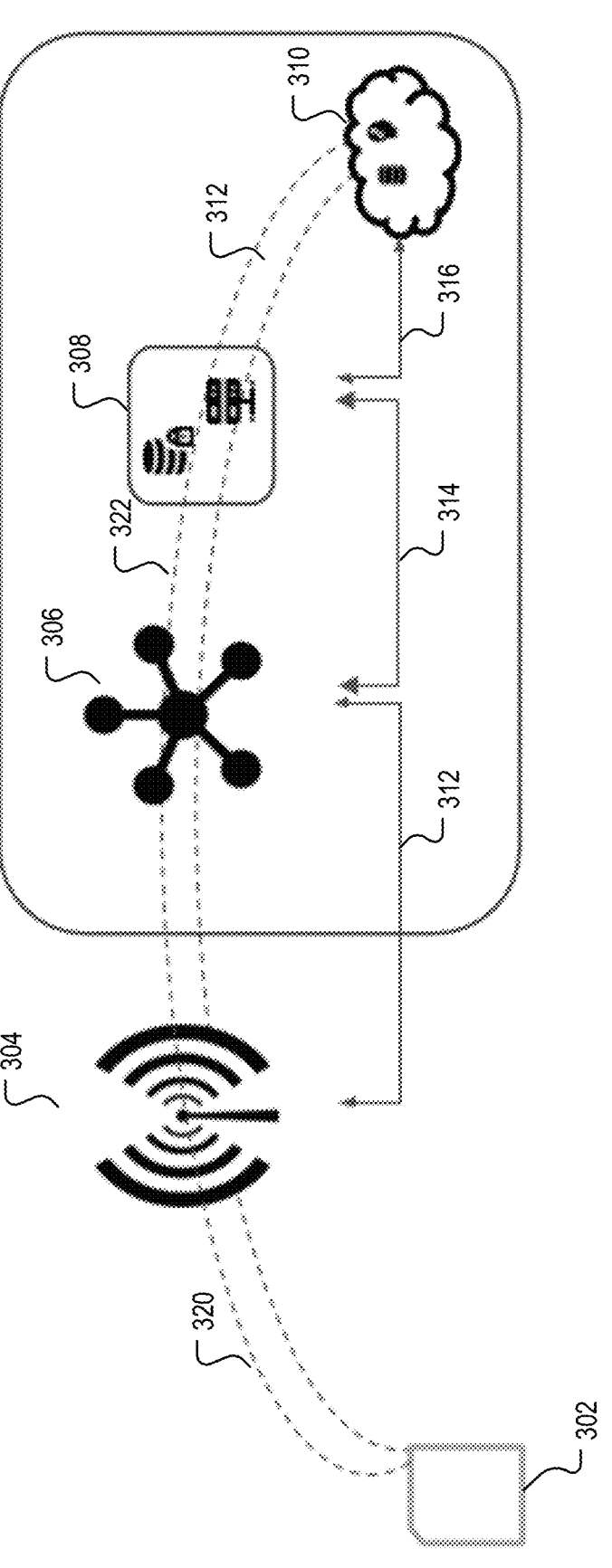
FIG. 3 illustrates a secure and virtual cross connect that can be implemented in cloud between the mobile core network virtualized in public cloud infrastructure and other independent cloud instances.

FIG. 3 provides a specific illustration. As shown in FIG. 3, the user 302 of the enterprise communicates with the radio access network 304 via private over-the-air communication channels 320. The radio access network 304 communicates with the private mobile core network 308 in the cloud via private physical connection 312, 314, and 322 through exchange 306. The communications between the mobile core network and the enterprise cloud computing infrastructures 310 may be based on private and secure routing within the cloud, as indicated by 312 and 316. At no point is any one of the communication legs between the user device 302 and the enterprise cloud computing infrastructure 310 exposed to non-private communications channels. The implementation of FIG. 3 with the cloud-based mobile core network thus provides secure connection between the user device 302 and the cloud infrastructure 310, leveraging the underlying security features implemented in the cloud and without the need of using additional tunneling technologies.

Figure 4:
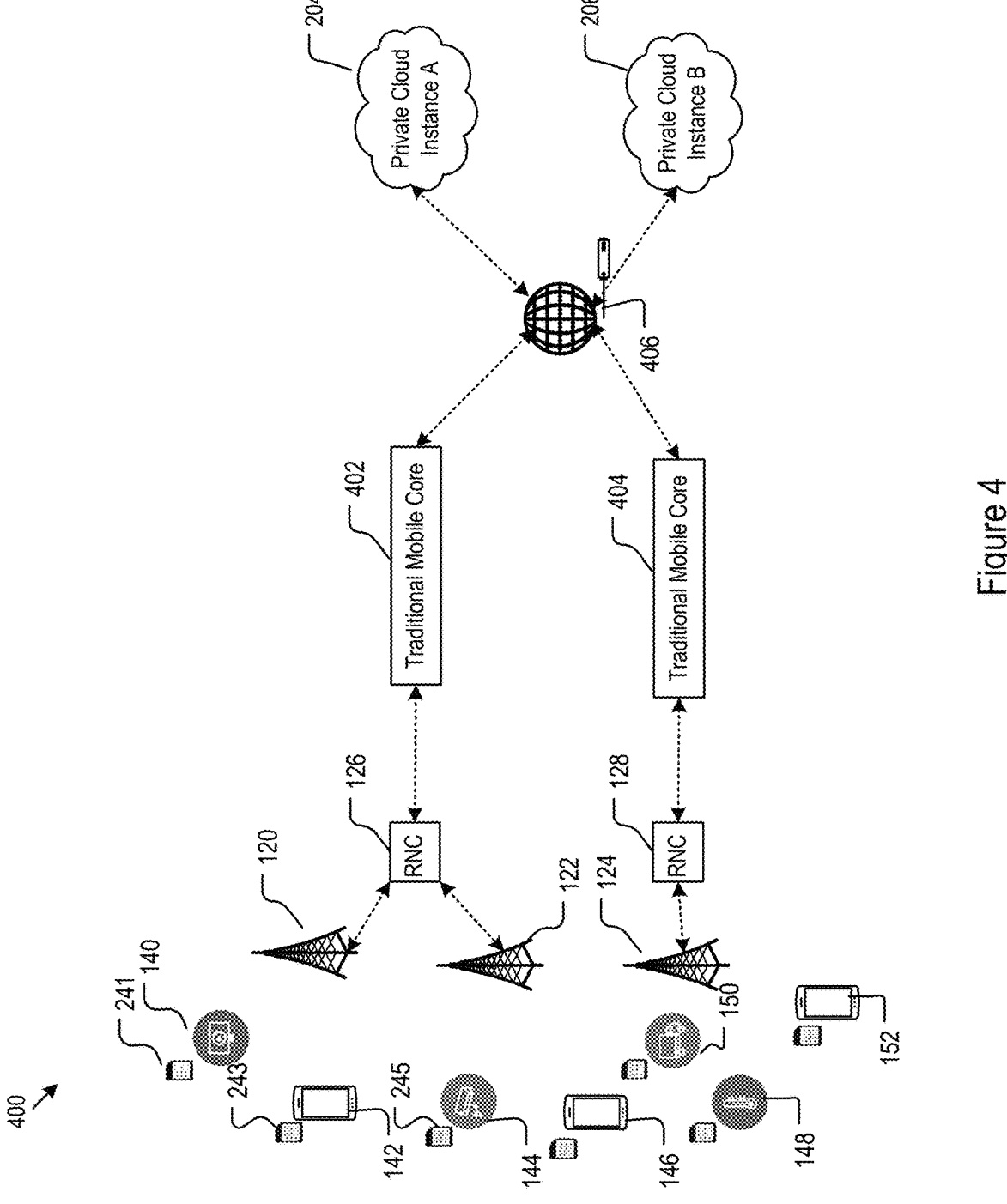
FIG. 4 shows a communication path between mobile devices and cloud instances via traditional mobile core networks implemented in hardware, showing connection legs that are exposed to unsecure public Internet.

Such security may not be easily implemented in traditional system using off-cloud mobile cores, as illustrated in system 400 of FIG. 4. As shown in FIG. 4, when the mobile core networks 402 and 404 are implemented off-cloud (for example, implemented as hardware-based mobile core networks), access of the cloud infrastructures 204 and 206 from the mobile core networks 402 and 404 would need to be via public internet 406. The communication between the user devices 140-152 and the cloud computing infrastructures 204 and 206 thus may be exposed to insecure communication channels at the leg involving the public internet 406, without any protection from the in-cloud security measures.

Figure 5:
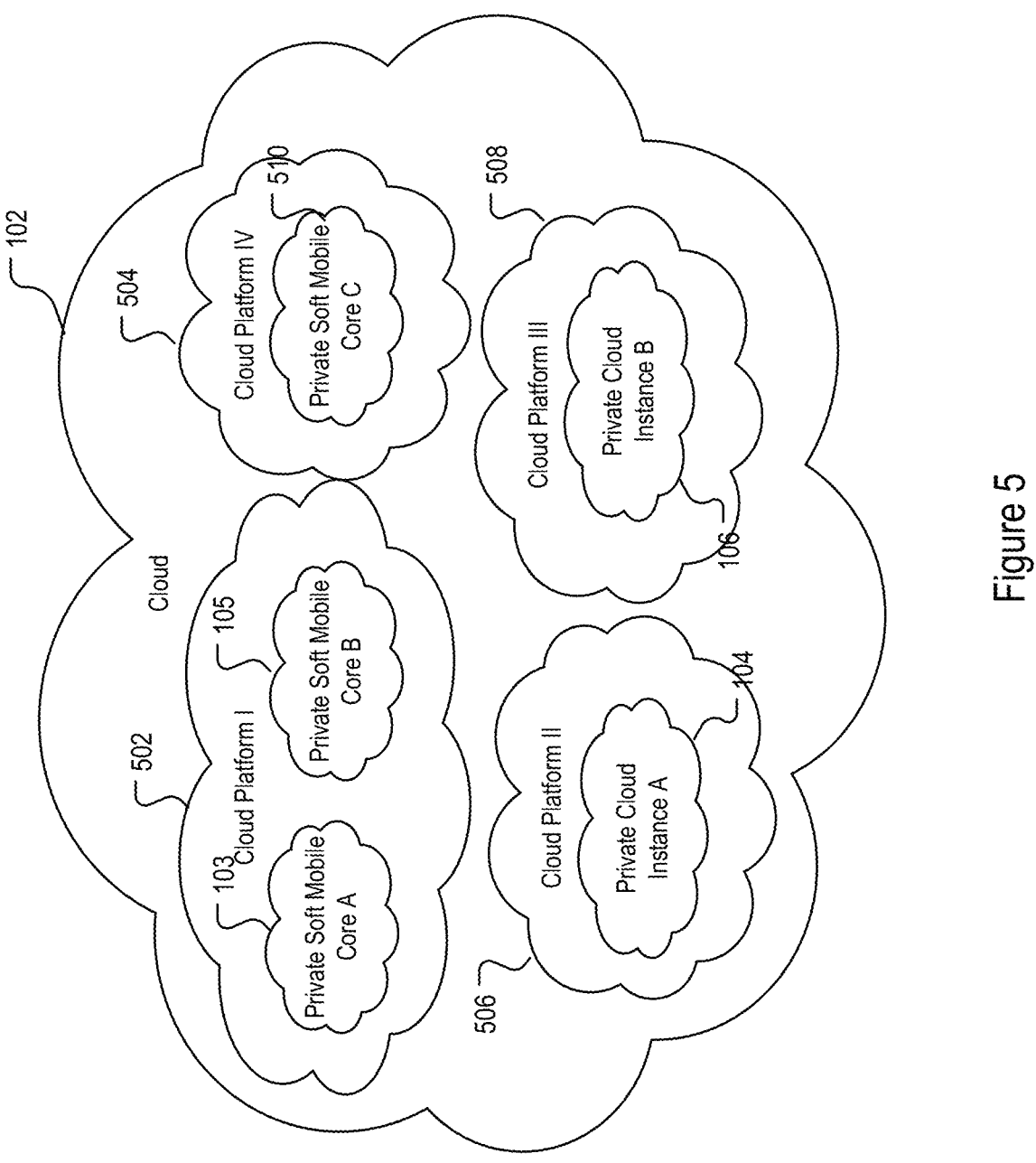
FIG. 5 shows an example of implementing mobile core networks and virtually cross connected to other cloud instances in an environment involving multiple different cloud platforms.

While the cloud platform 202 of FIG. 2 is illustrated as a single cloud platform, the system of FIG. 2 may alternatively be implemented in an environment having multiple cloud platforms, as illustrated in FIG. 5. In one exemplary implementation, the mobile core networks 103 and 105 may be both deployed as cloud instances in a cloud platform 502. In another exemplary implementation, the mobile core networks such as 103, 105 and 501 may be deployed in different cloud platforms 502 and 504. Likewise, the enterprise cloud computing infrastructures 104 and 106 may be deployed in the same or different cloud platforms 506 and 508. Software-defined mobile core networks that are capable of being deployed in different cloud platforms may provide added flexibility to a particular enterprise. For example, if the enterprise already has existing cloud computing infrastructure in a particular cloud platform, the same cloud platform may be chosen for deployment of its mobile core network such that the virtual cross connect between the mobile core network and the cloud computing infrastructure may also be implemented within the same cloud platform. The various cloud platform above may include but are not limited to AWS of Amazon™ Azure of Microsoft™, Google™ cloud, and IBM™ cloud.

Figure 6:
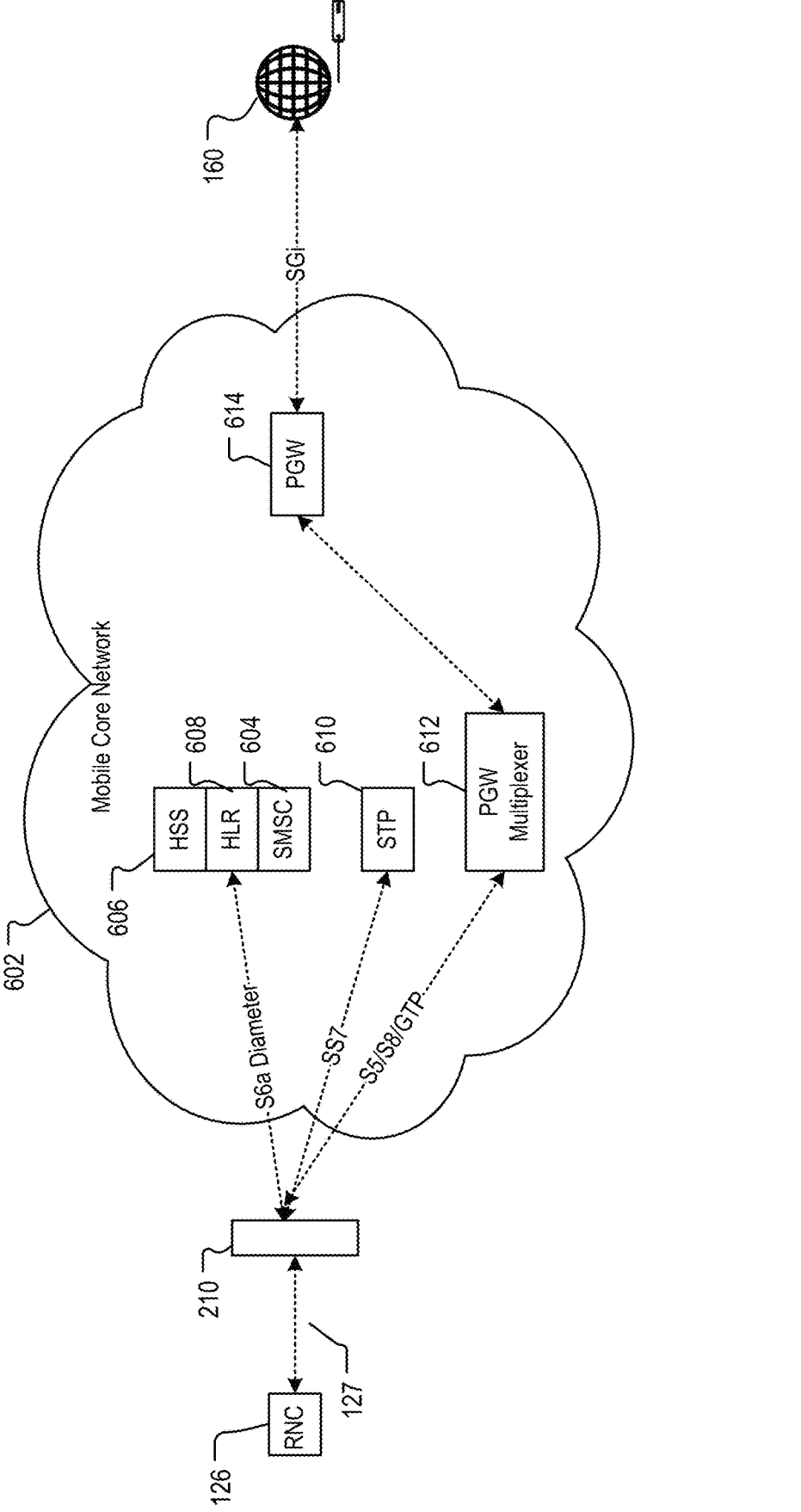
FIG. 6 illustrates exemplary functional components of a mobile core network for signaling, data processing, and information routing.

The mobile core network discussed above may include various functional blocks for mobile service management, data processing and routing. An example is shown in FIG. 6. The mobile core network 602 of FIG. 6 may include mobile service and subscription management components, database, or servers such as Short Message Service Center (SMSC), Home Subscriber Server (HSS), and Home Location Register (HLR). These components may communicate information with the RNC 126 according to, for example S6a Diameter protocol. The mobile core network may further include a Spanning Tree Protocol (STP) processing component for processing signaling information according to SS7 signaling protocol. The mobile core network may further include packet processing components such as the Packet GateWay (PGW) 614 and corresponding multiplexer 612 which communicate with RNC 126 via, for example, S5/S8/GPRS Tunneling Protocol (GTP), and communicate with external IP network 160 via SGi protocol.

FIG. 6 is merely shown as an example. Those of ordinary skill in the art understand that the mobile core network 602 may include many other components that are not shown in FIG. 6. For example, the mobile core network 602 may including other components for processing voice information that are not in the form of data packets and components for interfacing with the PSTN. The configuration of the mobile core network 602 may be guided by various underlying standards for 2G, 3G, LTE, 4G, and 5G mobile communication systems. These other configurations may be significantly different from the one illustrated in FIG. 6. However, the software-defined mobile core network implemented in the cloud and the underlying principle disclosed herein are applicable to those other mobile core configurations.

The various components of the software-based mobile core network may be implemented in the cloud as containers. In particular, each of the processing components above may be developed and packaged as an application including all required software stack and its dependencies (e.g., libraries). Such application packages may be deployed in the cloud as containers. Each application may be deployed as multiple independent instances of containers running on underlying computers in the cloud which share the same host operating system and its kernel. Other alternative implementation of the mobile core network components in clouds may be based on virtual machines. In comparison with the virtual machine architecture, the container implementation is generally lightweight, resource-conserving, and robust. Because they are lightweight, containers may be instantiated rapidly and efficiently. Thus, as the service volume and system resource needs for an application (e.g., a mobile core functional component) increase in rea-time, new instances of the container may be instantiated as needed to meet client demand, providing the elasticity desired for software-defined mobile core network. Likewise, when service volume of the application drops, excess containers may be removed quickly and efficiently with their user traffic redistributed to the remaining containers of the application. The software stack for the containers may be designed and then packaged using tool such as Docker™.

Figure 7:
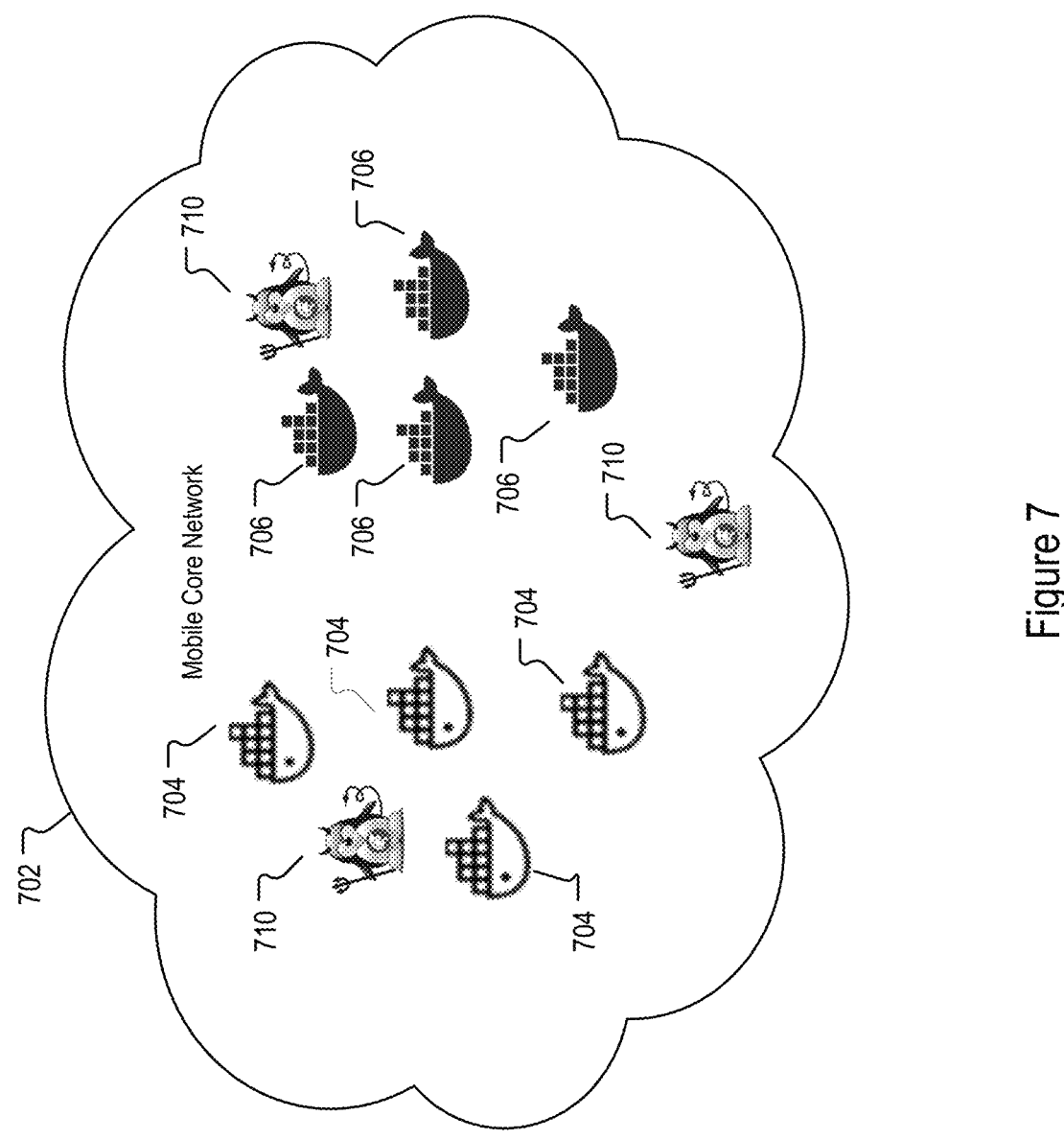
FIG. 7 shows an exemplary implementation of a mobile core network as a mixture of containers and daemons deployed in a public cloud infrastructure.

In addition to various instances of containers for different processing components, the implementation of the mobile core network may also include instances of other programs or daemons implemented in cloud that are designed to perform routing function within the mobile core network in, for example, data link and/or network layer of the OSI model. As such, cloud implementation of the mobile core network may include a mixture of containers and daemons, as illustrated in FIG. 7. In FIG. 7, the routing daemons are represented by 710. Containers 704 represent multiple instances of one of the multiple function components of the mobile core network (PGW containers, for example). Containers 706 represent multiple instances of another one of the multiple function components of the mobile core network (e.g., HLR). The routing daemons may be implemented for facilitating the functionality of a particular container or all of the multiple containers instances of the same components, or may be implemented to facilitate communications between containers of a same component or between containers of different components. A group of containers may be organized as a tanker.

Figure 8:
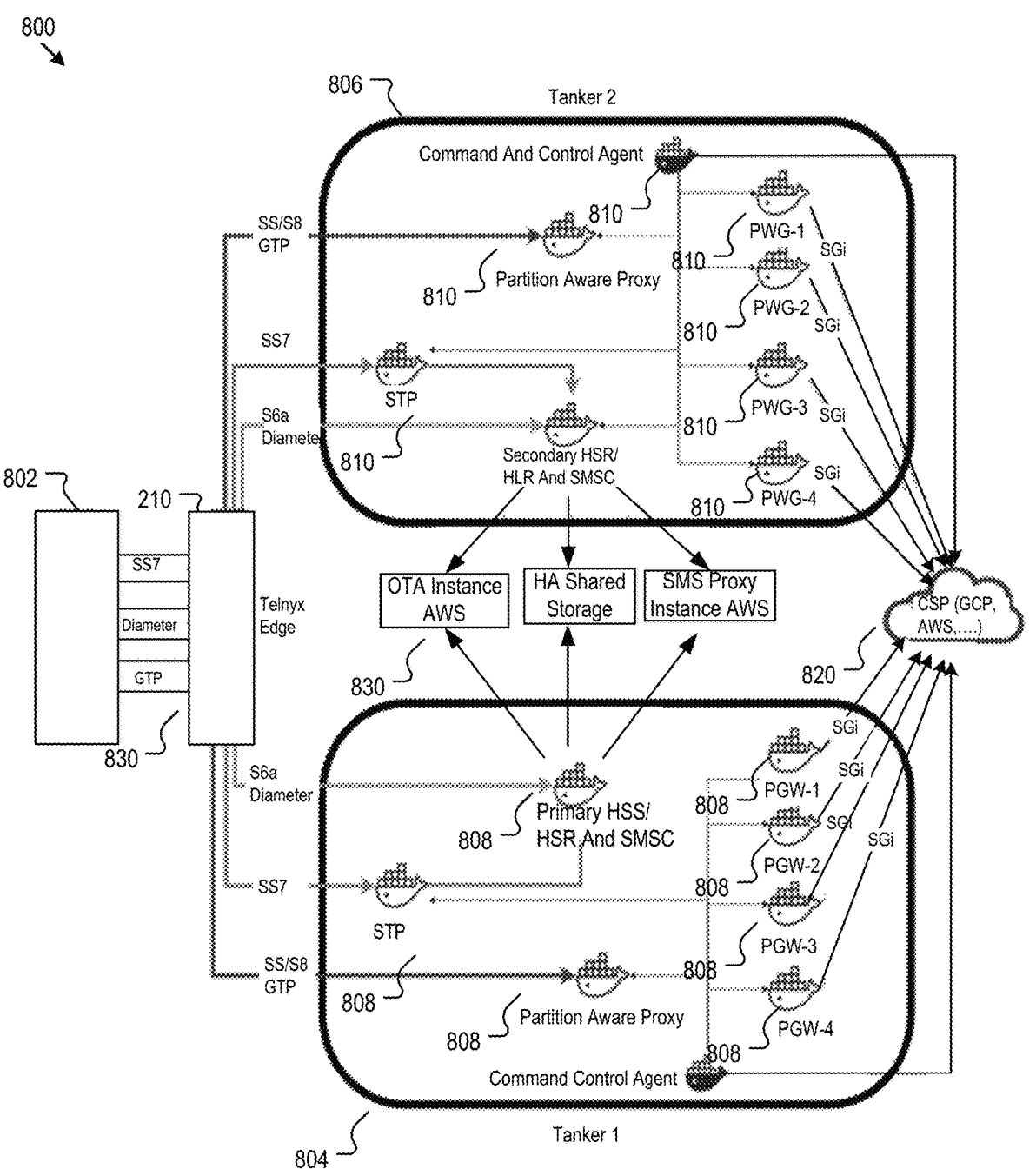
FIG. 8 illustrates another exemplary implementation of mobile core networks as containers and tankers.

FIG. 8 further illustrates an exemplary configuration of containers organized in tankers for implementing a mobile core network. As shown in FIG. 8, signals from a RNC may be intercepted by the exchange connectors 802 and 210, multiplexed according to signal type (as shown by 830, including but not limited to S6a diameter signals, SS7 signals, S5/S8 GTP signals), and then directed into the mobile core network implemented as cloud containers 808 and 810 organized as tankers 804 and 806. These containers may be deployed to implement various functions of the mobile core network, as described above. The mobile core network may be further connected to the other cloud instances 820 via virtual cross connect implemented in the cloud. Other cloud instances 830 (e.g., SMS proxy instances, Over-The-Air (OTA) instances, and HA shared storage instances) may be further implemented to facilitate the function of the mobile core network.

Figure 9:
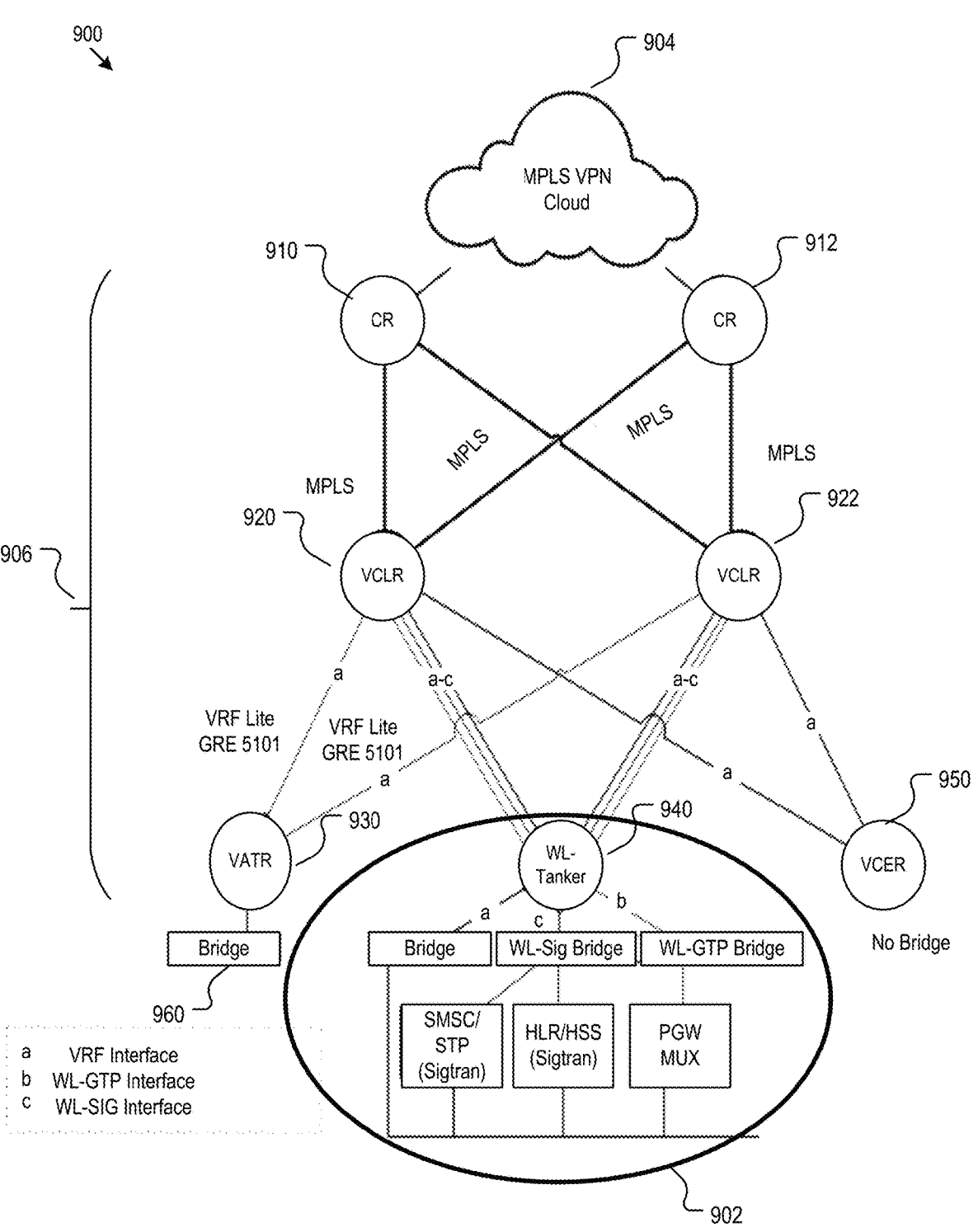
FIG. 9 shows exemplary routing layers implemented as daemons or containers in the cloud for facilitating end-to-end communications via the virtualized mobile core.

FIG. 9 shows more details for implementing data routing functions in network layer II and III (datalink layer and network layer) in the cloud between the mobile core networks and other networks on or off-cloud. The example data routing, as shown in FIG. 9, may be deployed in the cloud as routers at multiple levels, including core routers (CRs) 910 and 912, virtual cloud routers (VCLRs) 920 and 922, VRF (Virtual Routing and Forwarding) aware tanker router (VATR) 930, virtual CE routers (VCERs) 950 interconnected by various communication interfaces as indicated in FIG. 9. These multilevel virtual routers are connected with the virtual mobile core network 902 and a virtual multiprotocol-label-switching (MPLS) private cloud 904.

The various multilevel routers in FIG. 9 may be implemented as cloud daemons rather than containers. Specifically, public cloud service providers generally do not allow users to bring their own public IP space within the actual cloud container instances. In order to perform IP routing between PGWs, these virtual routers may be implemented as programs deployed in cloud (daemons). In an alternative implementation based on visualization using virtual machines within private hardware clusters rather than using containers, the IP addressing space may be more easily customizable. The multilayer IP routing scheme of FIG. 9 may be used in the container implementation to transpose the IP addressing space limitation in public cloud.

These routers form a cloud cluster and together with the mobile core container instances, form a particular virtual private cloud (VPC) for an, e.g., enterprise. The VCLRs 920 and 922 only plays routing roles and no actual service may be attached to these routers. The VATR may be a VRF aware cloud instance and provides services attached to a particular VRF. The VCER may not be VRF aware and may be designed to provide service with an ability to use anycast private/public IP. The VCER may not need to be tied to a particular VPC and can exists more than one instances in the network.

The VCLR essentially plays the PE role from the core routers. As such, adding or removing any service will only require changes in VCLR. No changes will be required from the core side. Also, as shown in FIG. 9, only two generic routing encapsulation (GRE) tunnels from VCLR to the core routers are sufficient to provide the service in high availability fashion. The use of MPLS between the VCLRs and the core routers and encapsulation of the MPLS in GRE tunnels also eliminate the requirement for having a tunnel per VRF (non-VRF Lite). The VCLRs are connected to other service instances (such as VATR, and WL-tanker, and VCER) via GRE tunnels under the basis of one tunnel per VRF (VRF Lite) and without use of MPLS.

The MPLS VPN 904 may be implemented in the cloud and provide a private network with global reach in all major cloud platforms (e.g., Google, AWS, Microsoft, IBM). As such, the wireless of IP traffic of an enterprise terminated at the PGW of the private mobile core may be privately routed to remote IP network of the enterprise. These remote site can be either a physical site or, as discussed earlier, a virtual network inside the cloud. In the case where the remote site is a virtual network inside the cloud, the routing instances and the MPLS VPN cloud 904 shown in FIG. 9 essentially function as the virtual cross connect described previously and shown as 207 and 208 in FIG. 2. The MPLS VPN cloud 904 further provides routing to other cloud clusters of mobile cores and routing instances such as the cloud cluster shown in FIG. 9.

Figure 10:
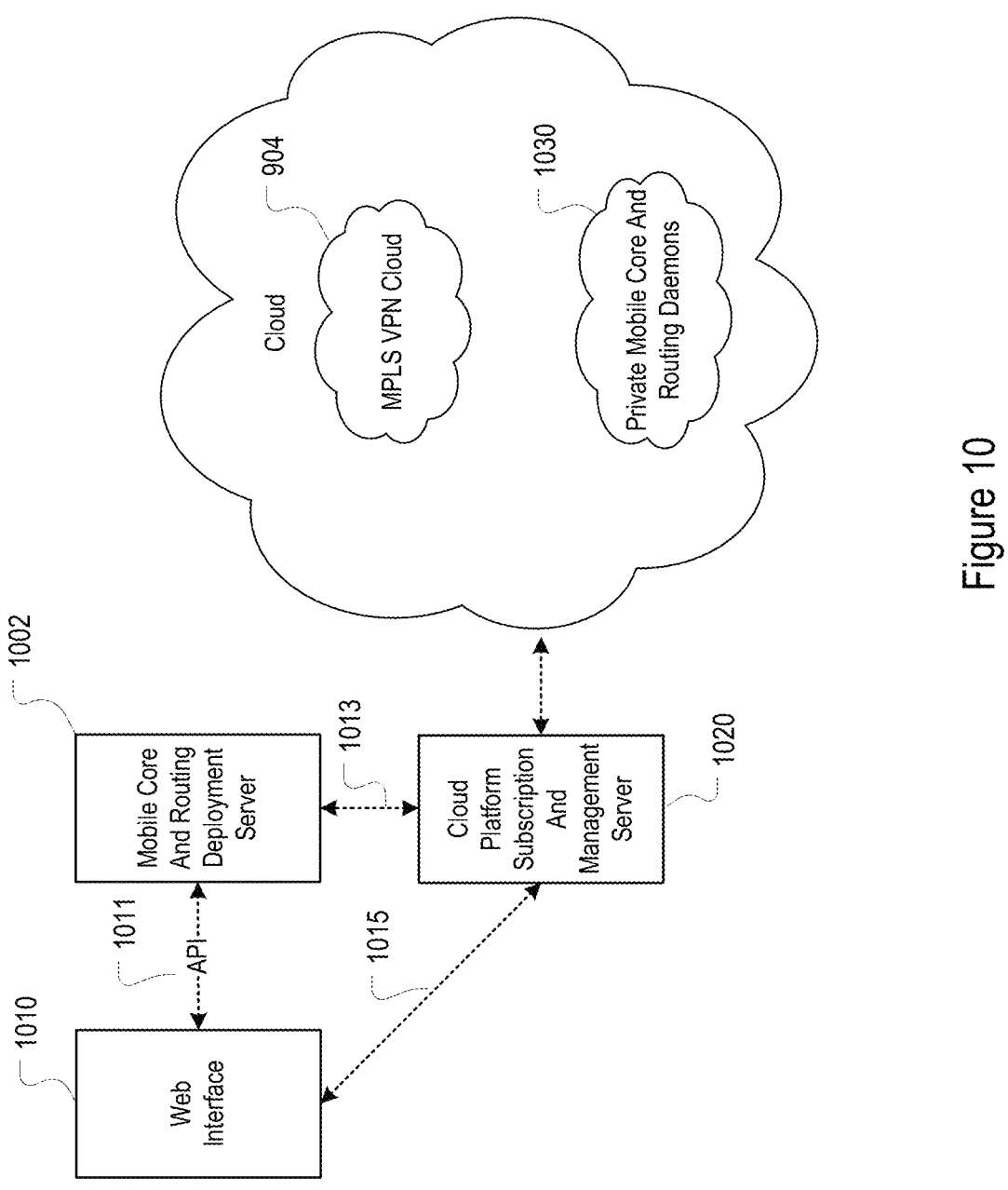
FIG. 10 illustrates an exemplary scheme for providing a service for automatic deployment and provisioning of private mobile core networks and virtual cross connect to other independent cloud instances.

FIG. 10 illustrates an exemplary manner in which the private and virtualized mobile core network and associated virtualized IP routing functions may be provided as a configurable service. The provider of the service may deploy the global MPLS VPN cloud 904. The provider of the service may further provide service configuration interface, such as a web interface 1010 to potential users (such as an enterprise user). A user may use the web interface to initiate a service request to a mobile core and routing server 1002 such that the provider of the service may instantly deploy the private mobile core and virtual routers 1030 for the user in the cloud. The user may further modify, configure and provision the deployed private mobile core and routers 1030 from the web interface 1010 via application program interface (API) 1011. The cloud resource subscription, allocation, and management may be provided by server 1020 from the cloud service provider. Requests for cloud resources needed for deploying the private mobile core and routers 1030 may be handled by the provider of the service and sent to server 1020, as shown by arrow 1013. Alternatively, interaction with the server 1020 may be made directly from the user, as shown by arrow 1015.

Figure 11:
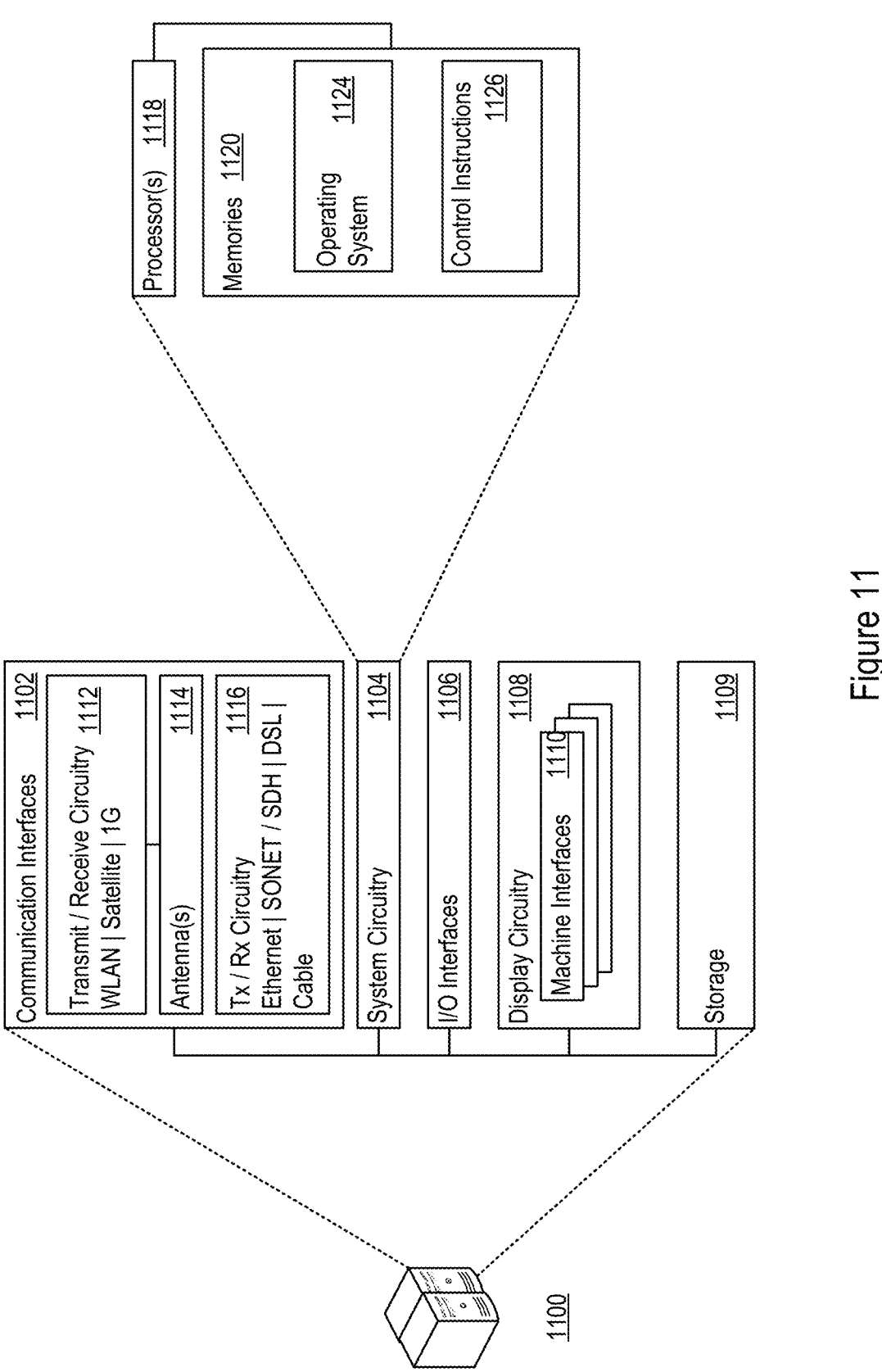
FIG. 11 shows an exemplary implementation of a computer device that may be used as the underlying hardware in the cloud or as a user terminal device.

Finally, FIG. 11 shows an exemplary computer system 1100 for implementing any of the computing components and devices needed for the disclosure above. The computer system 1100 may include communication interfaces 1102, system circuitry 1104, input/output (I/O) interfaces 1106, storage 1109, and display circuitry 1108 that generates machine interfaces 1110 locally or for remote display, e.g., in a web browser running on a local or remote machine. The machine interfaces 1110 and the I/O interfaces 1106 may include GUIs, touch sensitive displays, voice or facial recognition inputs, buttons, switches, speakers and other user interface elements. Additional examples of the I/O interfaces 1106 include microphones, video and still image cameras, headset and microphone input/output jacks, Universal Serial Bus (USB) connectors, memory card slots, and other types of inputs. The I/O interfaces 1106 may further include magnetic or optical media interfaces (e.g., a CDROM or DVD drive), serial and parallel bus interfaces, and keyboard and mouse interfaces.

The communication interfaces 1102 may include wireless transmitters and receivers ("transceivers") 1112 and any antennas 1114 used by the transmitting and receiving circuitry of the transceivers 1112. The transceivers 1112 and antennas 1114 may support Wi-Fi network communications, for instance, under any version of IEEE 802.11, e.g., 802.11n or 802.11ac. The communication interfaces 1102 may also include wireline transceivers 1116. The wireline transceivers 1116 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 1109 may be used to store various initial, intermediate, or final data. The storage 1109 may be centralized or distributed, and may be local or remote to the computer system 1100. For example, the storage 1109 may be hosted remotely by a cloud computing service provider.

The system circuitry 1104 may include hardware, software, firmware, or other circuitry in any combination. The system circuitry 1104 may be implemented, for example, with one or more systems on a chip (SoC), application specific integrated circuits (ASIC), microprocessors, discrete analog and digital circuits, and other circuitry. The system circuitry 1104 is part of the implementation of any desired functionality related to the components of the implementations above. As just one example, the system circuitry 1104 may include one or more instruction processors 1118 and memories 1120. The memories 1120 stores, for example, control instructions 1126 and an operating system 1124. In one implementation, the instruction processors 1118 executes the control instructions 1126 and the operating system 1124 to carry out any desired functionality related to the various components for the implementations above.

The implementations described above thus provide a fully-virtualized and software-defined mobile core network deployed as instances of containers and daemons in one or more public cloud platforms. The mobile core network may be deployed in conjunction with a multilayer virtual IP routing network also deployed in the public cloud platforms as cloud daemons for transposing the IP addressing space of the hardware components underlying the cloud platform and for routing the data traffic received and processed by the mobile core to other networks. These other networks may include but not limited to other private cloud networks, other independent cloud instances or applications, other fixed IP network (fixed wide-area-networks, for example), and public networks such as public internet and PSTN. In some implementation, the mobile data may be received by the mobile core and then routed within private cloud to remote global sites without exposing any of the communication legs to public internet, avoiding having to including additional overlay of security tunneling. The deployment of the mobile core and the virtual routing components in public cloud platforms may be integrally provided as a service to enterprises. As such, an enterprise may customize, deploy, configure, provision, and maintain its own mobile core and IP routing network instantly and via an API interface. The enterprise thus effectively acts as its own global mobile carrier.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

What is claimed is:

1. An information routing method performed by a software- defined and virtualized mobile core and data routing network deployed in a cloud platform, comprising:

receiving first data from a radio access network, the first data being originated from a wireless terminal device, the first data being encapsulated with a multilayer IP addressing space, wherein:

the virtualized mobile core and data routing network comprises one or more cloud instances of each of one or more data processing containers and a multilevel routing programs deployed in the cloud platform; and each of the one or more data processing containers corresponds to one or more mobile core functions and adjustable number of cloud instances according to a service volume level of the one or more mobile core functions; and transposing the multilayer IP addressing space to route the first data, using the one or more cloud instances of each of the one or more data processing containers and the multilevel routing programs over the cloud platform.

2. The method of claim 1, wherein the first data is transmitted via an over-the-air interface from the wireless terminal device to the radio access network containing at least one base station prior to being received by the software-defined and virtualized mobile core and data routing network.

3. The method of claim 1, wherein the software-defined and virtualized mobile core and data routing network comprises a first virtual packet gateway implemented as one instance of the one or more cloud instances of each of the one or more data processing containers, and the method further comprises:

routing the first data from the first virtual packet gateway to the multilevel routing programs over the cloud platform;

routing the first data by the multilevel routing programs to an independent cloud application via a virtual cross connect implemented in the cloud platform; and providing, to the wireless terminal device, access to the independent cloud application.

4. The method of claim 3, wherein the virtual cross connect comprises a virtual cloud network for routing multiprotocol label switching messages.

5. The method of claim 3, further comprising:

receiving second data directed from the radio access network in response to the second data being received by the radio access network from the wireless terminal device;

directing the second data to the first virtual packet gateway;

routing the second data from the first virtual packet gateway to the multilevel routing programs over the cloud platform; and routing the second data by the multilevel routing programs to an off-cloud remote IP network.

6. The method of claim 3, further comprising:

receiving second data directed from the radio access network in response to the second data being received by the radio access network from the wireless terminal device;

directing the second data to the first virtual packet gateway;

routing the second data from the first virtual packet gateway to the multilevel routing programs over the cloud platform; and routing the second data by the multilevel routing programs to an off-cloud mobile network.

7. The method of claim 3, further comprising:

receiving second data directed from the radio access network in response to the second data being received by the radio access network from the wireless terminal device;

directing the second data to the first virtual packet gateway;

routing the second data from the first virtual packet gateway to the multilevel routing programs over the cloud platform; and routing the second data by the multilevel routing programs to another software-defined and fully virtualized mobile core implemented in the cloud platform.

8. A circuitry in a cloud platform for implementing a software-defined and virtualized mobile core and data routing network, the circuitry being configured to implement:

a first set of instances of cloud containers configured to receive data from a wireless terminal device via a radio access network;

a second set of instances of cloud containers configured to perform a set of mobile core network functions by processing the data received by the first set of instances of cloud containers from the radio access network;

a third set of instances of cloud containers; and a set of multilevel virtual routers, wherein the circuitry is further configured to implement the third set of instances of cloud containers as packet gateways for routing the data processed by the second set of instances of cloud containers to the multilevel virtual routers;

wherein the circuitry is further configured to implement the multilevel virtual routers to route the data received at the multilevel virtual routers; and wherein the circuitry is further configured to implement each of the cloud containers to perform one or more mobile core functions and with an adjustable number of cloud instances in the first set of instances, the second set of instances, or the third set of instances according to a service volume level of the one or more mobile core functions.

9. The circuitry of claim 8, further configured to implement the multilevel virtual routers as a subset of core routers, a subset of virtual routing and forwarding (VRF) aware routers, or a subset of non-VRF aware routers.

10. The circuitry of claim 9, further configured to provide a connection between the subset of core routers and the subset of non-VRF aware routers under multiprotocol label switching encapsulated by generic routing encapsulation (GRE).

11. The circuitry of claim 8, further configured to cause the multilevel virtual routers to route the data to an independent cloud application.

12. The circuitry of claim 8, further configured to cause the multilevel virtual routers to route the data to an off-cloud remote IP network.

13. The circuitry of claim 8, further configured to cause the multilevel virtual routers to route the data to an off-cloud mobile network.

14. The circuitry of claim 8, further configured to cause the multilevel virtual routers to route the data to another software-defined and virtualized mobile core implemented in the cloud platform.

15. A communication network, comprising:

a software-defined and virtualized mobile core deployed in a cloud platform configured to receive and process data collected by a plurality of distributed sensors via a radio access network to generate output data, wherein the virtualized mobile core is configured to implement one or more instances of each of one or more data processing containers for processing the received data, the plurality of distributed sensors each being integrated with a wireless subscriber identity module (SIM) having multiple international mobile subscriber identity (IMSI) profiles that are remotely activatable; and a multilevel virtual router over the cloud platform deployed in the cloud platform configured to route the data collected by the plurality of distributed sensors, wherein each of the one or more instances of each of the one or more data processing containers is configured to perform one or more mobile core functions and with an adaptable number of cloud instances according to a service volume level of the one or more core mobile functions.

16. The communication network of claim 15, wherein the multilevel virtual router is configured to route at least a portion of the output data from the virtualized mobile core to a cloud application.

17. The communication network of claim 16, wherein the multilevel virtual router is configured to route another portion of the output data from the virtualized mobile core to an off-cloud remote IP network.

18. The communication network of claim 16, wherein the multilevel virtual router is configured to route another portion of the output data from the virtualized mobile core to another software-defined and virtualized mobile core implemented in the cloud platform.

19. The communication network of claim 15, wherein the multilevel virtual router comprises a subset of core routers, a subset of virtual routing and forwarding (VRF) aware routers, or a subset of non-VRF aware routers.

20. The communication network of claim 19, wherein a connection between the subset of core routers and the subset of non-VRF aware routers is based on multiprotocol label switching encapsulated by generic routing encapsulation (GRE).

* * * * *